May 19, 1964

A. E. WHIPP 3,133,462

MANUALLY OPERATED MULTIPLE NUT RUNNER

Filed April 5, 1963

INVENTOR.

Albert E. Whipp

INVENTOR.
Albert E. Whipp

United States Patent Office 3,133,462
Patented May 19, 1964

3,133,462
MANUALLY OPERATED MULTIPLE
NUT RUNNER
Albert E. Whipp, 17 Ecclestone Drive, Apt. 411,
Toronto 16, Ontario, Canada
Filed Apr. 5, 1963, Ser. No. 271,010
6 Claims. (Cl. 81—57)

This invention relates to portable wrenching tools and more particularly to a multiple wrenching tool for simultaneously running threaded fasteners situated in a fixed pattern and then sequentially tightening the fasteners to a pre-determined torque.

Multiple nut runners are used extensively in industry particularly in automobile manufacture and servicing. The preferred embodiment of the present invention finds particular application in the fitting and removal of automotive road wheels which are held on the hub usually by a fixed pattern of five studs and nuts equidistantly disposed around a standard pitch circle. Most tools of this nature are power operated, often by pneumatic means in the form of multiple air motors grouped together in a frame and fed by a common air manifold and control. When the proper tightening torque is reached, the motors are arranged to stall. Electrically operated tools are provided with pre-loaded slipping clutches for like purposes.

On production lines where such tools may be set up and operated from one position they prove very convenient. If their use is intermittent and in different areas such as in a small or medium size garage they become less convenient for the following reasons: by virtue of the power required to drive them, the tools are bulky and heavy; in pneumatic tools the air line may be of limited flexibility and awkwardly placed. These features make the tools awkward to manipulate conveniently to start the nuts on their threads and tiring to use for long periods since they may not be conveniently slung from pendants as is possible in a fixed location.

The present invention contemplates a multiple nut runner which is manually operated and therefore more convenient for occasional use, but which may be adapted for power operation by motor means of sufficient power necessary only to tighten a single fastener.

It is the primary object of this invention to provide a multiple nut running tool whereby multiple standard threaded fasteners patterns may be run down simultaneously and tightened progressively and sequentially, and including a casing having a plurality of spindles mounted therein and adapted to rotate members of a workpiece, toothed gear rotatably mounted on each of said spindles and a pre-loaded slippable clutch drivingly interposed between each of said gears and its mounting spindle, a shaft rotatably mounted within the casing and carrying, drivingly engaged therewith, a composite driving gear having a fully toothed circumferential portion engaging said gears in a first position of said shaft and a partially toothed portion engaging any one only of said gears at any rotative angle in a second position of said shaft, and means for transmitting torque to said shaft.

It is a secondary object of this invention to provide a multiple nut running tool which may be conveniently manually operated.

It is a further object to provide a multiple nut running tool light in weight and which may be adapted for power operation on a minimum power requirement.

Other objects and advantages will become apparent to those skilled in the art from the following description taken in conjunction with the accompanying drawings in which like reference characters refer to like parts throughout and in which.

Figure 1:
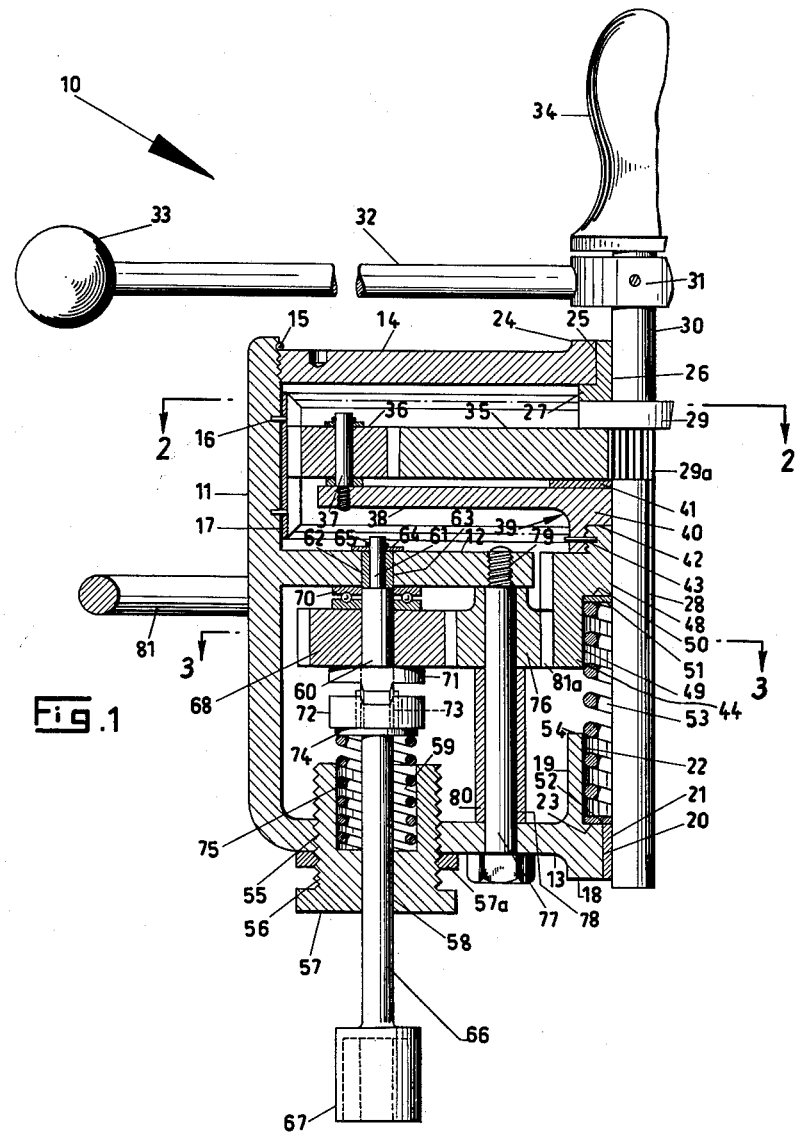
FIG. 1 is a longitudinal section through a portion of a tool constructed in accordance with the invention.
Figure 2:
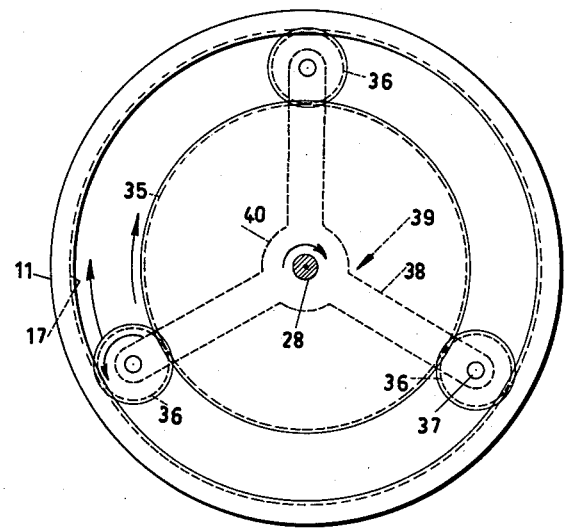
FIG. 2 is a transverse section taken along the line 2—2 in FIG. 1.
Figure 3:
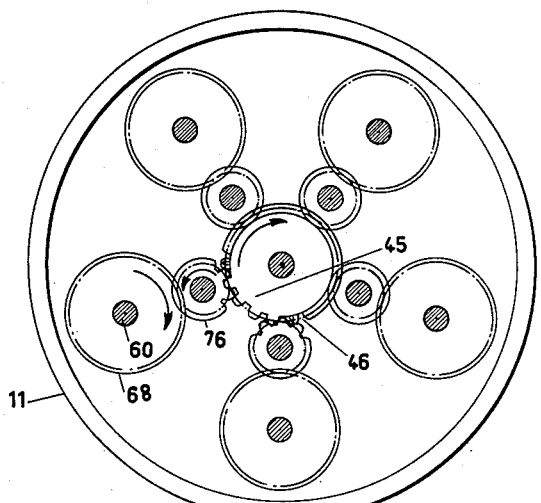
FIG. 3 is a transverse section taken along the line 3—3 in FIG. 1.

Referring now more particularly to FIG. 1 wherein a multiple nut running tool is indicated at 10, a generally cylindrical casing 11 is preferably cast from a light alloy material. Substantially midway of the casing 11 and integrally cast therewith is an inwardly extending radial flange 12. An integral end wall 13 closes the lower end of the casing 11 and a removable end plate 14 is threadably attached to the casing at the upper end thereof. A circlip or other suitable locking means is provided to lock the end plate 14 in position. Secured to the inner side wall of casing 11 above radial flange 12 in any convenient fashion, such as, for example shrink fitting and dowel pins 16, is a gear-toothed annulus 17.

Lower end wall 13 is provided with a centrally disposed external boss 18 and a corresponding, though deeper, internal boss 19. Boss 18 is bored at 20 and fitted with a bushing 21 of bearing metal such as bronze. Boss 19 is counterbored at 22 forming a step 23. Upper end plate 14 is provided with a central boss 24 bored at 25 to receive a bushing 26 having a radial flange 27. Rotatably carried in bushings 21 and 26 is a shaft 28 having an integral radial flange 29 which normally abuts flange 27 of bushing 26. An end 30 of shaft 28 extends from bushing 26 exteriorly of end plate 14 and carries a hub 31 drivingly attached thereto. Hub 31 is provided with two diametrically opposed radial arms 32 which terminate in ball ends 33. Shaft end 30 terminates in a handle 34 which may be fixed freely rotatably thereon, or provided with a reversible ratchet mechanism according to preference. Both hub 31 and handle 34 are removable for assembly purposes.

Drivingly attached to shaft 28 below flange 29 in any convenient manner such as by splines 29a is a toothed driving gear 35. Meshing with gear 35 and annulus 17 are three planetary pinions 36 rotatably carried on upstanding stub axles 37 at the extremities of three equiangularly disposed arms 38 of a spider 39. A hub 40 of spider 39 is freely rotatable on shaft 28 and an antifriction shim plate separates gear 35 from the spider 39. Drivingly attached to hub 40 of spider 39 as by a threaded spigot 42, locked by a dowel pin 43, is a composite driving gear 44.

Figure 4:
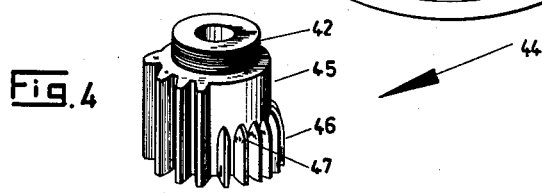
FIG. 4 is a perspective view of a composite gear utilized in the present invention.

Referring also to FIG. 4, gear 44 is divided into an upper portion 45 and a lower portion 46. Lower portion 46 is fully circumferentially toothed while upper portion 45 is toothed over an arc substantially one fifth of the full circumference, the remaining four fifths of the circumferential arc being ground down to the root diameter circle. The teeth on upper portion 45 are continuations of the teeth on the lower portion 46 while upper ends 47 of the teeth of lower portion 46 are provided with a lead as clearly shown in FIG. 4. Bored at 48 to be freely rotatable on shaft 28, gear 44 is counter-bored at 49 for approximately half its axial length defining a step 50 and for a purpose hereinafter to be described.

An anti friction washer 51 bears against step 23 in counterbore 22 of boss 19. Interposed between washers 51 and 52 is a helical compression spring 53. It may be seen from the structure thus far described that spring 53 normally urges shaft 28 and the components carried by it into a first position with flange 29 against radial flange 27 of bushing 26 which forms an upper limit stop. However, by applying an axial force through handle 34 to overcome the force exerted by spring 53, shaft 28 and its appendages may be urged into a second position determined by an end surface 54 of boss 19 contacting composite gear 44 and providing a lower limit stop. The internal gear teeth of annulus 17 are of sufficient length that the teeth of pinions 36 are always in engagement therewith. It may be further seen that the gear train thus described constitutes an epicyclic reduction gear for which a minimum reduction ratio of about 2.4:1 may be obtained. Other ratios and other forms of reduction gearing may be used if the device is adapted for power operation.

Lower end wall 13 of casing 11 is bored at equiangularly disposed stations 55 which coincides with the standard arrangement of the threaded fasteners of the workpiece. Bores 55 are threaded and engaged by lock nuts 57a. Bushings 56 are bored at 58 and counterbored internally at 59. Rotatably carried in bores 58 of bushings 56 are spindles 60 having upper ends 61 of reduced diameter carried in bushings 62 shrunk into bores 63 in flange 12 and aligned with bushings 56. Spindles 60 are retained at their upper ends by washers 64 and circlips 65; lower ends 66 of the spindles extend from bushings 56 and terminate in standard wrenching sockets 67.

Freely rotatable on each shaft 60 is a toothed gear 68 of the same diameter and tooth pitch as composite driving gear 44. Interposed between the upper radial surface of gear 68 is a male slipping dog clutch element 71 while a female slipping dog clutch element 72 is carried axially slidable on spindle 60 and drivingly coupled thereto by splines 73. An antifriction washer 74 abuts the lower surface of clutch element 72 and a helical compression spring 75 is interposed between the washer 74 and bushing 56. The bushings 56 may be screwed in and out of bores 55 thereby pre-setting the torque at which the clutch elements 71 and 72 will slip out of engagement.

Interposed between each gear 68 and composite driving gear 44 is an idler pinion 76, each carried on a shaft comprising a shoulder bolt 77 entered into a bore 78 in end wall 13 and screwed into a threaded bore 79 in flange 12. A distance tube 80 positions the idler pinion with respect to gear 44 and gears 68. Lower ends 81a of the teeth of idlers 76 may be provided with a lead such as the ends 47 of the teeth of driving gear 44 for purposes clearly explained hereinafter. The purpose of the idler gear is merely to preserve the correct direction of rotation of the spindles 60 so that the tool, in use, will be instinctive. In a power operated version the idler gear would be unnecessary since the control of a reversible motor could be easily adapted to instinctive operation.

Single or double D handles 81 may be provided on casing 11 for handling the tool as will be described in the operation thereof.

In Operation

To remove a set of nuts from an automobile wheel the tool is grasped in one hand by means of a D handle 81 and the wrenching sockets are offered up to the nuts. Since it is unlikely that the nuts will be completely aligned with all the sockets pressure is exerted on handle 34 by the other hand to move shaft 28 and therefore composite gear 44 into the second position. In this position, the upper portion 45 of gear 44 is aligned with idlers 76 and therefore is engaged with only one of them. Slight movement of the tool by means of handle 34 will engage the sockets with the nuts on the workpiece. Axial pressure on handle 34 is maintained and the hand holding D handle 81 is now transferred to bar 32. Turned in an anticlockwise direction the toothed sector on upper portion 45 of gear 44 engages each pinion 76 sequentially in one revolution and loosens each nut a fifth of a turn. A further turn of gear 44 may be necessary to fully release all nuts but the epicyclic reduction gear provides a considerable mechanical advantage added to the physical strength of the operator. As soon as the axial pressure on handle 34 is relaxed the shaft 28 and gear 44 move to the first position with all the pinions 76. The leads on tooth ends 47 of gear 44 and the tooth ends 81a of idler pinions 76 assist in the re-engagement of the fully toothed portion of gear 44. In this position all the workpiece nuts may be spun off simultaneously by spinning the bars 32 which are assisted in turning by the end weights 33. Transfer of one hand to the D handle 81 is now required before all nuts run off the ends of the studs of the workpiece.

In assembly, a threaded fastener is entered into each wrenching socket 67 and the tool is offered up to the workpiece. Shaft 28 is turned clockwise by means of bars 32 with the free hand or, if handle 34 is fixed, or provided with a reversible ratchet mechanism as may be found convenient, then shaft 28 may be turned by this means. Once the threaded fasteners have started on their threads, the bars 32 may be spun rapidly to run the fasteners down to their seats. When this stage is reached, handle 34 is urged toward the tool and shaft 28, all its appendages, and, therefore, composite gear 44 move to the second position. The toothed sector of the upper portion 45 of gear 44 is engaged with only one gear 68. Turning of shaft 28 therefore turns spindle 60 anything up to one-fifth of a turn before the toothed sector moves out of engagement with the gear 68 driving the spindle and into engagement with the next gear 68. In one revolution of the composite gear 44 each spindle 60 through its gear 68 is advanced sequentially one-fifth of a turn. Continued turning of the gear 44 in its second position continues to advance each spindle 60 and, therefore, the threaded fastener, sequentially in increments of one-fifth of a turn. At the point where the resistance of the fastener to turning equals the pre-loading on the clutch element 72 through spring 75, the male dogs of element 71 slip out of the female dogs of element 72 and no further tightening of the fastener occurs. The clutch on each spindle 60 slips as the fastener it is driving reaches its torquing value.

It may be seen that in the first position when the threaded fasteners are freely running, they may be conveniently run down simultaneously. In the second position it is only necessary to apply enough power to tighten each fastener to its torquing value singly. Moreover, the fasteners are tightened in sequential increments which agrees with the best work shop practices.

It should be understood that the specific form of invention herein disclosed may be subjected to various changes and modifications without departing from the spirit of the invention as set forth in the appended claims.

I claim:

1. A multiple nut runner comprising a casing, a plurality of spindles mounted in the casing relative to each other and having ends extending from the casing and adapted to rotate members of a workpiece, a toothed gear rotatably mounted on each of said spindles and a pre-loaded slippable clutch drivingly interposed between each of said gears and its mounting spindle, a shaft rotatably mounted within the casing and carrying, drivingly engaged therewith, a composite driving gear having a fully toothed circumferential portion engaging said gears in a first position of said shaft and a partially toothed portion engaging any one only of said gears at any rotative angle in a second position of said shaft; and means for transmitting torque to said shaft.

2. A multiple nut runner comprising a casing, a plurality of spindles mounted in the casing relative to each other and having ends extending from the casing and adapted to rotate members of a workpiece, a toothed gear rotatably mounted on each of said spindles and a pre-loaded slippable clutch drivingly interposed between each of said gears and its mounting spindle, a shaft rotatably mounted within the casing and carrying, drivingly engaged therewith, a composite driving gear having a fully toothed circumferential portion engaging said gears in a first position of said shaft and a partially toothed portion engaging any one only of said gears at any rotative angle in a second position; resilient means urging the shaft into said first position; and means for transmitting torque to said shaft.

3. A multiple nut runner comprising a casing, a plurality of spindles mounted in the casing relative to each other and having ends extending from the casing and adapted to rotate members of a workpiece, a toothed gear rotatably mounted on each of said spindles and a pre-loaded slippable clutch drivingly interposed between each of said gears and its mounting spindle, and an idler pinion associated with each of said gears; a shaft rotatably mounted within the casing and carrying, drivingly engaged therewith, a composite driving gear having a fully toothed circumferential portion engaging said idler pinions in a first position of said shaft and a partially toothed portion engaging any one of said idler pinions at any rotative angle in a second position and said shaft; and means for transmitting torque to said shaft.

4. A multiple nut runner comprising a casing, a plurality of spindles mounted in the casing relative to each other and having ends extending from the casing and adapted to rotate members of a workpiece, a toothed gear rotatably mounted on each of said spindles and a pre-loaded slippable clutch drivingly interposed between each of said gears and its mounting spindle; an idler pinion associated with each of said gears; a shaft rotatably mounted within the casing and carrying, drivingly engaged therewith, a composite driving gear having a fully toothed circumferential portion engaging said idler pinions in a first position of said shaft and a partially toothed portion engaging any one only of said idler and pinions at any rotative angle in a second position of said shaft; resilient means urging the shaft into said first position; and means for transmitting torque to said shaft.

5. A multiple nut runner comprising a casing, a plurality of spindles mounted in the casing relative to each other and having ends extending from the casing and adapted to rotate members of a workpiece, a toothed gear rotatably mounted on each of said spindles and a pre-loaded slippable clutch drivingly interposed between each of said gears and its mounting spindle; a shaft rotatably mounted within the casing and carrying, rotatable thereon, a composite driving gear having a fully toothed circumferential portion engaging said gears in a first position of said shaft and a partially toothed portion any one only of said gears at any rotative angle in a second position of said shaft; speed reducing means drivingly intercoupling the shaft and said composite driving gear; and means for transmitting torque to said shaft.

6. A multiple nut runner comprising a casing, a plurality of spindles mounted in the casing relative to each other and having ends extending from the casing and adapted to rotate members of a workpiece, a toothed gear rotatably mounted on each of said spindles and a pre-loaded slippable clutch drivingly interposed between each of said gears and its mounting spindle and an idler pinion associated with each of said gears; a shaft rotatably mounted within the casing, an epicyclic reduction gear associated with the shaft and drivingly coupling the shaft to a composite driving gear rotatably mounted thereon, the said composite driving gear having a fully toothed circumferential portion engaging any one only of said idler pinions at any rotative angle in a second position of said shaft, a compression spring associated with the casing and the composite gear to urge the composite gear into said first position, means associated with said shaft to selectively urge said composite gear into said second position; and means for transmitting torque to said shaft.

References Cited in the file of this patent

UNITED STATES PATENTS

| 1,744,976 | Levedahl | Jan. 28, 1930 |
| 2,069,882 | Hall | Feb. 9, 1937 |
| 2,780,944 | Ondeck | Feb. 12, 1957 |

FOREIGN PATENTS

| 338,572 | Italy | Mar. 31, 1936 |
| 553,713 | Italy | Jan. 2, 1957 |